J. A. SCOTT & C. CHRISTENSEN.
SPARE RIM CARRIER AND CONTRACTOR.
APPLICATION FILED JAN. 2, 1917.
1,258,474.   Patented Mar. 5, 1918.
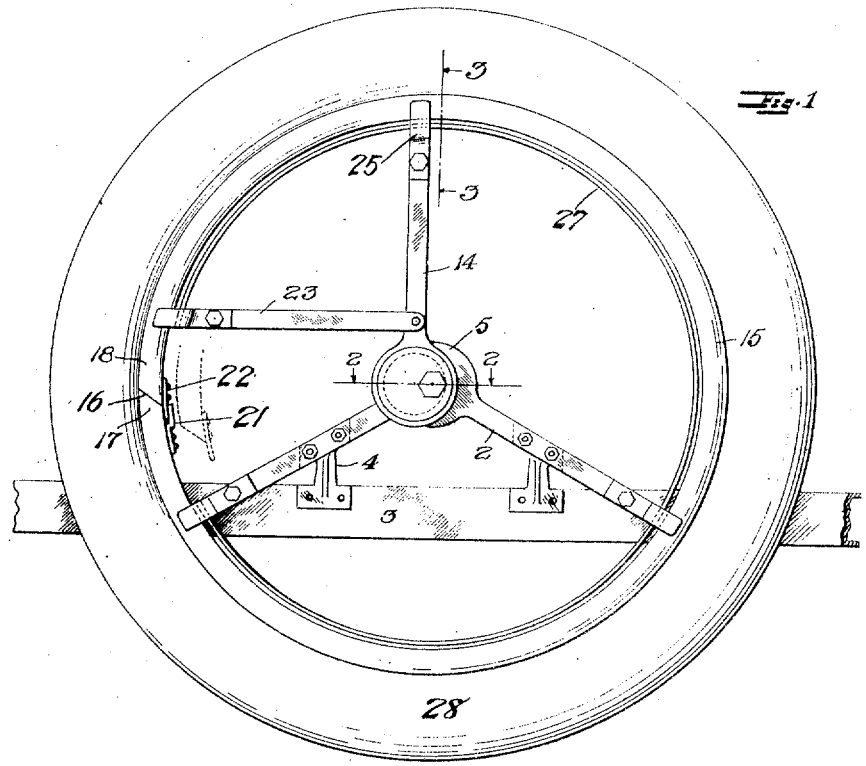
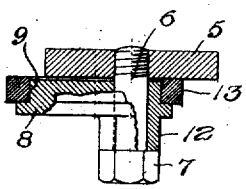
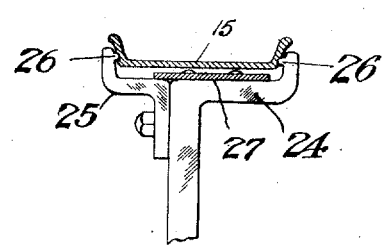
WITNESS
J. B. Gardner
INVENTORS
J. A. SCOTT
C. CHRISTENSEN
BY White & Prost
THEIR ATTORNEYS

UNITED STATES PATENT OFFICE.

JESSE A. SCOTT, OF OAKLAND, AND CARL CHRISTENSEN, OF SAN FRANCISCO, CALIFORNIA; SAID CHRISTENSEN ASSIGNOR TO SAID SCOTT.

SPARE-RIM CARRIER AND CONTRACTOR.

1,258,474.

Specification of Letters Patent.     Patented Mar. 5, 1918.

Application filed January 2, 1917. Serial No. 139,995.

*To all whom it may concern:*

Be it known that we, JESSE A. SCOTT and CARL CHRISTENSEN, citizens of the United States, and residents, respectively, of the city of Oakland, county of Alameda, and of the city and county of San Francisco, both, in the State of California, have invented a certain new and useful Spare-Rim Carrier and Contractor, of which the following is a specification.

The invention relates to devices which are attached to automobiles for carrying spare rims or spare rims with tires mounted thereon.

An object of the invention is to provide a combined spare rim carrier and rim tool for contracting and expanding split rims for the purpose of detaching tires therefrom or attaching tires thereto.

The invention possesses other advantageous features, which, with the foregoing, will be set forth at length in the following description where we shall outline in full that form of the invention which we have selected for illustration in the drawings accompanying and forming part of the present specification. In said drawings we have shown one specific form of our invention, but it is to be understood that we do not limit ourselves to such form, since the invention as expressed in the succeeding claims may be embodied in a plurality of forms.

Referring to said drawings:

Figure 1 is an elevation of one form of the device of our invention with a spare rim and tire mounted thereon.

Fig. 2 is a cross section of the device taken on the line 2—2, Fig. 1.

Fig. 3 is a cross section taken on the line 3—3, Fig. 1.

The majority of automobiles are provided on the rear with a rack or carrier for spare rims and tires which is permanently attached to the frame or other part of the automobile. In accordance with our invention, we have provided a spare rim carrier which is so constructed that it may be operated to contract and expand the rim to facilitate removing a tire therefrom or attaching one thereto. The carrier is firmly and permanently attached to the automobile so that it affords a stable support for the rim while it is being manipulated. The device comprises preferably a cross bar 2 of any suitable shape which is attached to the frame 3 of the automobile by brackets 4 or other suitable means, the arm being preferably so shaped that the middle portion 5 thereof lies at the center of the rim.

Screwed into the middle portion 5 of the arm is a bolt 6 provided with a head 7 and rotatably mounted on the bolt is a plate or element 8 having an outer circular edge 9, eccentric to said bolt. The plate is provided with a hexagonal or other suitably-shaped boss 12 through which the bolt passes and which contacts with and is of the same shape as the bolt head 7. Surrounding the eccentric plate 8 is a strap 13 which is preferably formed integral with the arm 14, which is provided on its outer end with means for engaging the split rim 15. The arm 14 is preferably, but not necessarily, vertically disposed and engages the rim at such point that an outward movement of the arm will separate the ends of the rim at the split 16. One end of the arm 2 engages the rim at the other side of the split and preferably adjacent thereto, so that one end 17 of the rim is held rigid and the other end 18 is movable with respect thereto. The rim is provided on the end 17 with a seat 21 and on the end 18 with a tongue 22 which engages in the seat and prevents any relative radial movement of the two ends of the rim. A third arm 23 pivoted to the arm 14 adjacent its inner end and clamping the rim adjacent the end 18 is preferably used to cause a radial movement of the end 18 after it has been moved a sufficient distance to disengage the tongue from its seat.

The ends of the arms are provided with shoulders 24 on which the rim seats and with clamps 25 for securely locking the rim to the shoulders. The clamps and the shoulders may be provided with lugs 26 which engage in depressions in the rim to prevent a movement of the rim with respect to the arms, but the grip of the clamps is usually sufficient to prevent such movement. The arms are preferably secured together so that they will retain their relative positions when a rim is not on the holder, by a circular strip of thin metal 27, which is secured to the shoulders. This strip may not extend around to the end of arm 23 so that this arm may be removed to improve the appearance of the device when it is not being used to contract or expand the rim.

In Fig. 1 the device is shown complete with a rim and a tire 28 thereon. To remove the tire from the rim, a socket wrench is used to first loosen the bolt 6, and then the wrench is pressed on further to engage the boss 12 and the wrench is then turned in a clock-wise direction rotating the eccentric to first raise the arm 14 and then move it toward the right. In being raised, the arm 14 raises the end 18 of the rim to disengage the latch thereon. The movement of the arm 14 to the right produces a corresponding movement of the arm 23 and consequently a corresponding movement of the end 18 of the rim. A further movement of the eccentric lowers the arm 14 and consequently the end 18 of the rim, placing such end in the position indicated by the dotted lines in Fig. 1. The bolt 6 is preferably unscrewed about one-half a revolution so that when the rim has been contracted as indicated, the bolt again seats and clamps the parts in the contracted position. The tire 28 may then be readily removed from the rim. A reversal of this operation, after the tire has been replaced, moves the parts to the position shown in Fig. 1.

We claim:

1. In a spare split tire rim carrier for automobiles, means for supporting a split rim from a vehicle, and means co-acting therewith for moving the ends of the rim out of circular alinement while the rim is mounted on the carrier.

2. A spare split tire rim carrier for automobiles, comprising means permanently attached to the automobile for carrying the rim, and constructed to permit the ends of the rim to be moved into overlapping relation and means coöperatively related to the carrying means for moving the ends of the rim into overlapping relation and for moving them back into alinement while the rim is mounted on said carrying means.

3. A spare split tire rim carrier for automobiles, comprising means permanently attached to the automobile for carrying the rim, and means coöperatively related to the carrying means for engaging the rim for moving one end of the rim into overlapping relation with the other end of the rim while the rim is mounted on the carrier.

4. The combination with an automobile, of a contractible spare split tire rim carrier permanently mounted thereon, and means coöperatively related to the carrier for contracting said rim to permit removal of the tire while the rim is mounted on said carrier.

5. A spare split rim carrier for automobiles, comprising a frame permanently attached to the automobile and engaging the rim, a movable arm engaging said frame and attached to said rim and means for moving said arm with respect to said frame.

6. A spare split rim carrier for automobiles, comprising a frame permanently attached to the automobile and engaging the rim, a circular, rotatable element eccentrically mounted on said frame, and an arm engaging said rotatable element and secured to said rim.

7. A spare split rim carrier for automobiles comprising a frame permanently attached to the automobile and engaging the rim, a circular, rotatable element eccentrically mounted on said frame, an arm engaging said rotatable element and secured to said rim, and means for clamping said rotatable element to said frame.

8. A spare split rim carrier for automobiles, comprising a frame permanently attached to the automobile and engaging the rim, an arm engaging the rim and said frame and being movable with respect to said frame and means for moving said arm.

9. A spare split rim carrier for automobiles, comprising a frame permanently attached to the automobile and engaging the rim, an arm engaging the rim at a point remote from the engagement of said frame and movably engaging said frame, means for moving said arm with respect to said frame, and another arm connecting said first-mentioned arm and the rim adjacent the line of splitting.

In testimony whereof, we have hereunto set our hands at San Francisco, California, this 26th day of December 1916.

JESSE A. SCOTT.
CARL CHRISTENSEN.

In the presence of—
H. G. PROST.